(12) United States Patent
Spooner

(10) Patent No.: US 6,786,068 B2
(45) Date of Patent: Sep. 7, 2004

(54) LOCKING DEVICE FOR PINTLE TYPE TRAILER HITCH

(76) Inventor: John G. Spooner, 300 Nottingham, Glenview, IL (US) 60025

( * ) Notice: Subject to any disclaimer, the term of this patent is extended or adjusted under 35 U.S.C. 154(b) by 0 days.

(21) Appl. No.: 10/324,504

(22) Filed: Dec. 20, 2002

(65) Prior Publication Data

US 2003/0151228 A1 Aug. 14, 2003

Related U.S. Application Data

(60) Provisional application No. 60/344,017, filed on Dec. 20, 2001.

(51) Int. Cl.[7] .............................................. E05B 73/00
(52) U.S. Cl. ................ 70/14; 70/34; 280/507
(58) Field of Search ................... 70/14, 32–34, 70/232, 258; 280/507

(56) References Cited

U.S. PATENT DOCUMENTS

| | | | | | |
|---|---|---|---|---|---|
| 3,844,143 A | * | 10/1974 | Hudson | ........................ | 70/14 |
| 4,186,575 A | * | 2/1980 | Bulle | ............................ | 70/14 |
| 4,376,544 A | * | 3/1983 | Sette et al. | ................. | 280/507 |
| 4,380,160 A | * | 4/1983 | Hoffman | ........................ | 70/14 |
| 4,440,005 A | * | 4/1984 | Bulle | ............................ | 70/14 |
| 5,332,251 A | * | 7/1994 | Farquhar | .................... | 280/507 |
| 5,343,720 A | * | 9/1994 | Slater | ............................ | 70/14 |
| D417,133 S | * | 11/1999 | Niswanger | ................... | D8/331 |
| 6,412,313 B1 | * | 7/2002 | Bernstrom | .................... | 70/14 |
| 6,467,317 B1 | * | 10/2002 | Hillabush et al. | ............. | 70/56 |
| 6,598,432 B1 | * | 7/2003 | Dwyer | .......................... | 70/14 |

OTHER PUBLICATIONS

Http://www.ssbtractor.com/pintle_hooks.html; 3 pages.

* cited by examiner

*Primary Examiner*—Suzanne Dino Barrett
(74) *Attorney, Agent, or Firm*—Marshall, Gerstein & Borun LLP

(57) ABSTRACT

A locking device for trailer hitches of the pintle ring/hook type is disclosed to include a lower base portion with an upstanding locking eye insertable into the pintle ring. An upper lock portion containing a shank lock is mountable onto the lower base portion with the locking eye within a lock slot of the shank lock. The shank lock is then locked in position after having passed through the locking eye so as to securely lock the base and lock portions of the locking device within the pintle ring and with the locking bolt of the shank lock completely contained within the lock and not being exposed outside of the lock.

10 Claims, 3 Drawing Sheets

LOCKING DEVICE FOR PINTLE TYPE TRAILER HITCH

CROSS-REFERENCE TO RELATED APPLICATION

This application claims the priority benefit of U.S. Provisional Patent Application No. 60/344,017, filed on Dec. 20, 2001.

FIELD OF THE DISCLOSURE

This disclosure relates to locking devices and, more particularly, to locking devices for trailer hitches of the pintle ring type to be engaged by pintle hooks.

BACKGROUND OF THE DISCLOSURE

Many publicly and/or privately owned items, such as construction tool boxes, traffic signal and warning lights, information displays, etc., are maintained on trailers for ease of towing to the desired location. Often times the item must remain at the desired site for several days or months. Accordingly, the towing vehicle is often disengaged from the trailer hitch for use in other areas, thus leaving the trailer on site and unprotected.

Typically, the trailer hitch includes a heavy, round doughnut formed portion known as a "pintle ring" at the end of the trailer for engagement by a hitch coupler known as a "pintle hook" on the towing vehicle. When the pintle hook is disengaged from the pintle ring and the towing vehicle is removed, it becomes possible for someone to steal the trailer and the associated items by attaching a hitch coupler pintle hook of another vehicle to the pintle ring and driving away with the trailer.

In an attempt to prevent such thefts, the trailer can be hoisted in the air or blocked by other vehicles, such as at a construction site, to make the trailer hitch and pintle ring inaccessible to others. Another attempt to prevent theft of the trailer utilizes a block locking device inserted into the eye of the pintle ring and maintained in a blocking position by a padlock to prevent removal of the block from the pintle ring. However, the locking U-shaped bars of the padlock are exposed, so that one can readily hacksaw through the padlock bars or snap the bars with large cutters, and thereby remove the block from the eye of the pintle ring.

Accordingly, it is desired to provide a locking device for pintle ring type trailer hitches which cannot be readily removed. In particular it is desired to provide such a locking device in which the locking mechanism is not externally exposed and is therefore not accessible for cutting by a hacksaw or large cutters.

SUMMARY OF THE DISCLOSURE

In accordance with one aspect of the disclosure, a pintle ring lock is disclosed which may comprise a base and a locking cap. The base may include a bottom plate from which an appendage extends with an aperture extending through the appendage. The locking cap is adapted to lock onto the base with the locking cap having a top plate with a lock mounted thereto. The top plate includes a slot adapted to receive the appendage, while the lock includes a movable bolt adapted to extend through the appendage aperture.

In accordance with another aspect of the disclosure, a pintle ring lock assembly is disclosed which may comprise a pintle ring, a base, and a locking cap. The pintle ring may include an annular frame and central hole, while the base may include a bottom plate from which the appendage extends. The appendage may have an aperture therethrough. The locking cap is mounted to the base and includes a top plate with the lock mounted thereto. The top plate includes a slot with a bolt movable into and out of the slot. The appendage is adapted to extend through the slot with the bolt being movable into and out of the appendage aperture. The bottom plate and top plate sandwich the pintle ring therebetween.

In accordance with another aspect of the disclosure, the method of securing a pintle ring against theft is disclosed which may comprise the steps of inserting the appendage through the pintle ring, the appendage extending from a bottom plate and including an aperture, mounting a locking cap onto the appendage, the locking cap having a top plate with a slot to receive the appendage, and extending a locking bolt from the locking cap across the top plate and through the appendage aperture.

These and other aspects in features of the disclosure will become more apparent upon reading the following description when taken in conjunction with the accompanying drawings.

Figure 1:
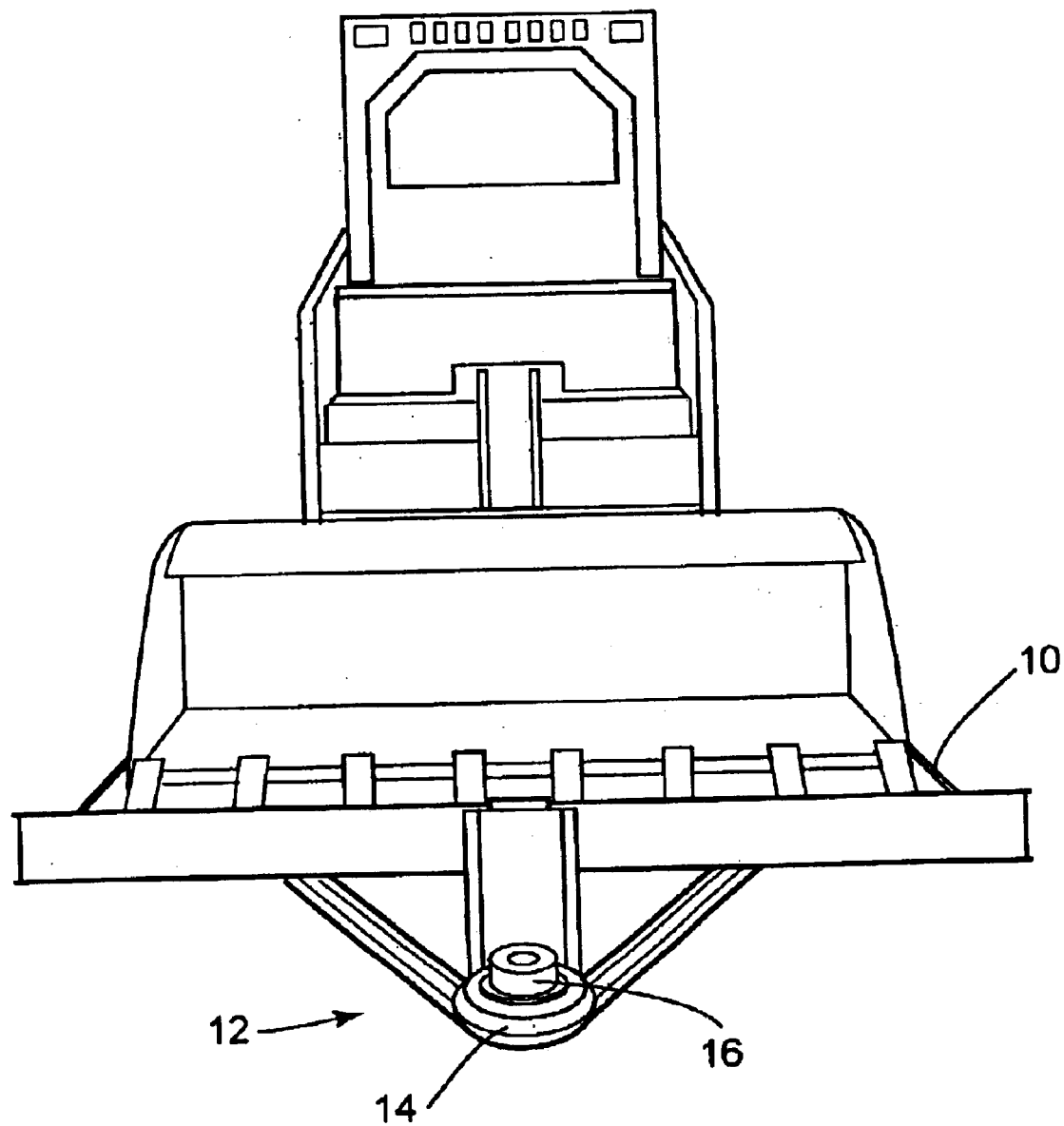
FIG. 1 is a perspective view illustrating a construction trailer hitch apparatus containing the locking device constructed in accordance with the present disclosure and mounted in the trailer hitch pintle ring.

While the disclosure is susceptible to various modifications and alternative constructions, certain illustrative embodiments thereof have been shown in the drawings and will be described below in detail. It should be understood, however, that there is no intention to limit the invention to the specific forms disclosed, but on the contrary the intention is cover all modifications, alternative constructions, and equivalents falling within the spirit and scope of the invention as defined by the appended claims.

DETAILED DESCRIPTION

FIG. 1 illustrates a construction trailer 10 which includes a trailer hitch 12 with a pintle ring 14 defining a pintle eye 15 and into which has been mounted a locking device 16 in accordance with the principles of the present invention.

Insertion of the locking device 16 within the eye 15 of the pintle ring 14 prevents theft of a trailer and accompanying items by preventing someone from merely attaching a pintle hook of a towing vehicle hitch to the pintle ring 14.

FIGS. 2–7 illustrate the components of the locking device of the present invention and the manner in which it is placed and locked onto the pintle ring 14.

Figure 2:
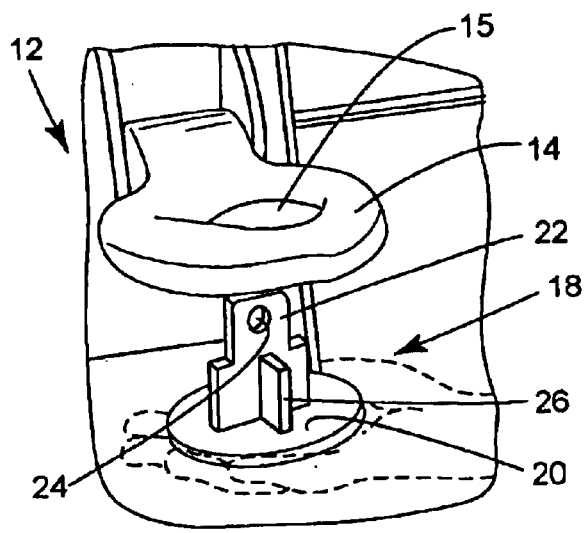
FIG. 2 is a perspective view illustrating the lower base portion of the locking device and positioned for insertion into the pintle ring.

As shown in FIG. 2, the locking device 16 of the present invention includes a lower base portion 18 which includes a flat heavy metal base portion 20 upon which have been rigidly mounted an upstanding locking portion 22 having an aperture forming a locking eye 24, and a support wall 26 at right angles to the taller locking portion 22. It is understood of course that the support wall 26 includes a support portion on each side of the locking portion 22 so that the locking portion 22 and the support wall 26 are in the form of a cross both of which are rigidly mounted on the flat base portion 20.

The base portion 20, the upstanding locking portion 22 and the support wall 26 are formed of a thick metal, such as one-quarter inch steel.

Figure 3:
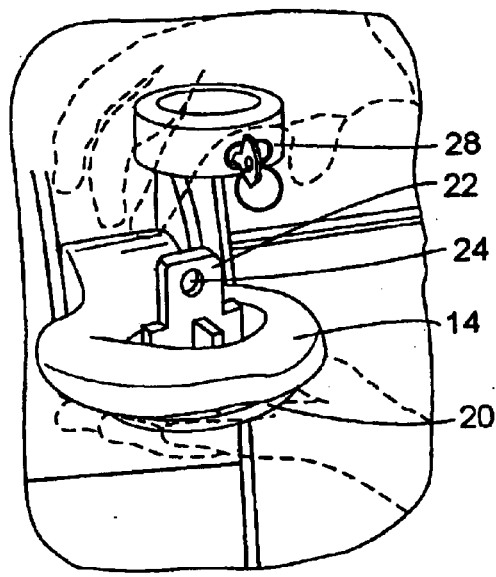
FIG. 3 is a perspective view illustrating the lower base portion of the locking device as inserted into the pintle ring.
Figure 4:
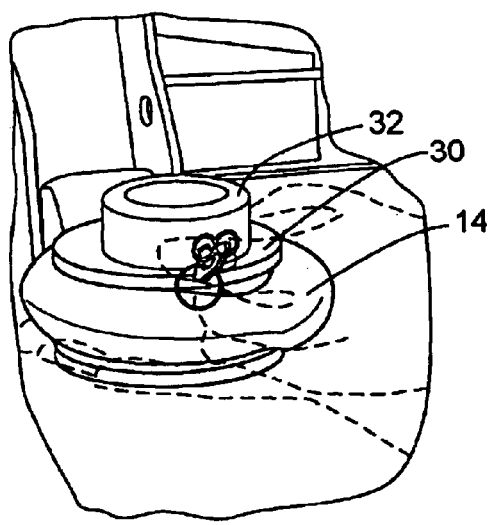
FIG. 4 is a perspective view illustrating the upper lock portion of the locking device containing a lock as inserted into engagement with the lower base portion of the locking device in the pintle ring.

FIG. 3 illustrates the insertion of the locking portion 22 into the pintle eye 15, with the flat base portion 20 adjacent the bottom of the pintle ring 14 and the locking eye 24 of the locking portion 22 extending through the locking ring 14. FIG. 3 also illustrates an upper lock portion 28 of the locking device 16, and with the upper locked portion 28 being held in position above the ring 14 and ready for mounting onto the locking portion 22.

Figure 6:
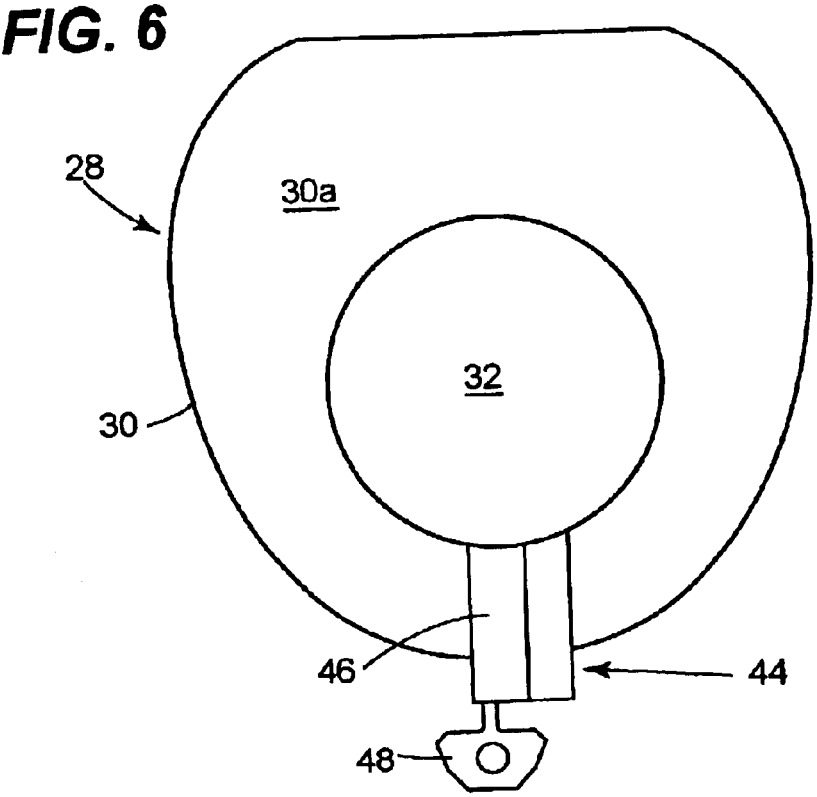
FIG. 6 is a top plan view of the upper lock portion of the locking device of this invention with the lock bolt and key in the extended open position.
Figure 7:
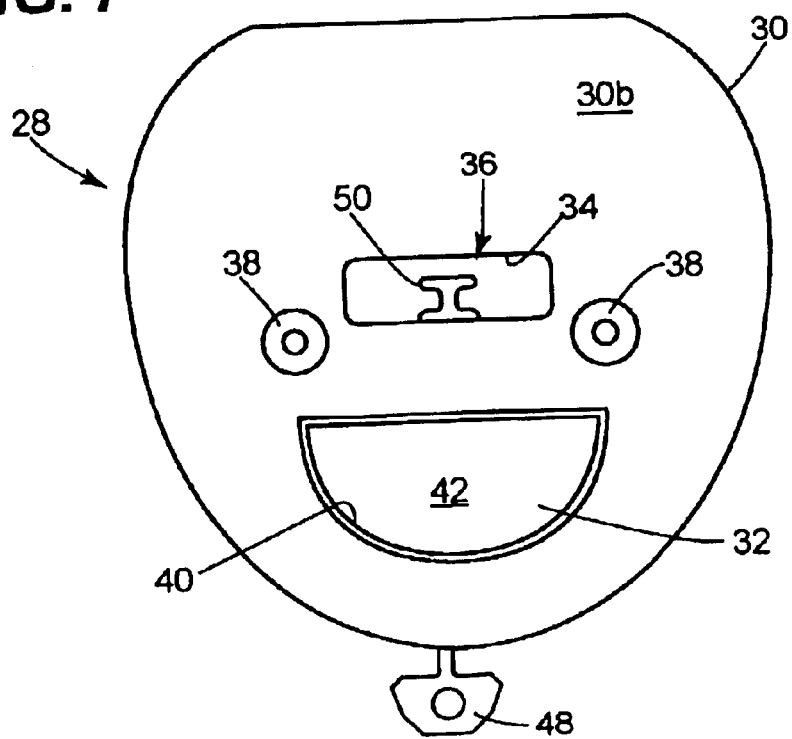
FIG. 7 is a bottom plan view of the upper lock portion of the locking device with the lock bolt in a partially inserted position in the lock cavity.

Referring to FIGS. 6 and 7, the details of the upper lock portion 28 are illustrated. The upper lock portion 28 includes a flat mounting base 30 with opposite surfaces 30a, 30b, to which is mounted a commercially available shank lock 32. As can be seen from FIG. 7, the mounting base 30 includes an elongated slot 34 which matches and is aligned with a lock slot 36 in the lock 32.

The lock 32 is mounted to the base 30 by means of two mounting bolts 38 which pass through respective apertures in the mounting base 30 so as to threadably engage the lock 32 and be tightened against surface 30b. A half moon cut out 40 is provided in the mounting base to accommodate a similarly shaped half moon portion 42 of the lock 32 to securely maintain the lock 32 mounted on the base 30. It is understood of course that with other commercially available shank locks, appropriate mounting of the lock to a sturdy mounting base can be accomplished as needed by those skilled in the art in accordance with the teachings herein.

With reference to FIGS. 6 and 7, the lock 32 is shown as including a locking bolt 44 which includes a locking bolt cylinder 46 which at one end is adapted to receive a key 48 and at the other end includes a locking shank lock portion 50. For illustrative purposes, FIG. 6 shows the locking bolt and locking bolt cylinder in the fully extended position such that the locking shank 50 is withdrawn from the lock slot 36, whereas FIG. 7 shows the locking bolt and cylinder being inserted partly into the lock so that the locking shank 50 appears within the lock slot 36. It is understood of course that as in a conventional shank lock, a lock cavity is provided in the lock slot 36 directly opposite the locking shank 50 so that the locking shank 50 can be inserted into the locking cavity with the key 48 in a selected position, and then when the key 48 is turned 90°, the locking shank 50 locks within the locking cavity.

Now returning to FIGS. 3 and 4, it can be seen that the lock portion 28 can be mounted onto the lower base portion 18 by initially sliding the locking bolt 44 and cylinder 46 to the fully extended position shown in FIG. 6 to fully withdraw the locking shank 50 from the lock slot 36. Next, the lock slot 36 is aligned with the locking portion 22 and the upper lock portion 28 is lowered towards the lower base portion 18 such that the locking eye 24 is inserted into the lock slot 36 and in alignment with the locking shank 50 to assume the positions shown in FIG. 4.

Figure 5:
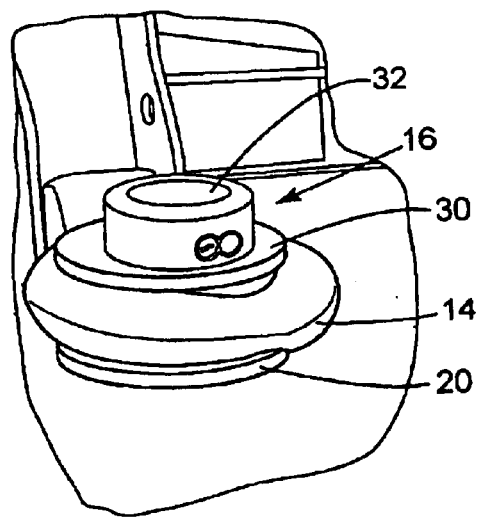
FIG. 5 is a perspective view illustrating the locking device in position in the pintle ring with the lock key removed.

The key 48 is then moved towards the lock 32 to slide the locking bolt and cylinder inside the lock 32 so that the locking bolt 44 and the locking shank 50 slides through the locking eye 24 and the locking shank can engage the locking cavity at the other end of the lock slot 36. The key 48 is then turned 90° which locks the locking shank 50 within the locking cavity and the key is removed as shown in FIG. 5.

Accordingly, with the locking device 16, mounted on the pintle ring 14 so as to completely occupy the space within the pintle eye 15, undesired theft of the construction trailer 10 and associated items has been prevented. Also, note that the locking bolt and cylinder are completely enclosed within the lock and are not accessible outside of the lock.

The foregoing detailed description has been given for clearness of understanding only, and no unnecessary limitations should be understood therefrom, as modifications will be obvious to those skilled in the art.

I claim:

1. A pintle ring lock, comprising:
    a base having a bottom plate from which an appendage extends, the appendage having an aperture therethrough; and
    a locking cap adapted to mount onto the base, the locking cap having a top plate with a lock mounted thereto, the top plate having a slot therethrough adapted to receive the appendage, the lock including a movable bolt adapted to extend through the appendage aperture, the lock being bolted to the top plate.

2. The pintle ring lock of claim 1, wherein the base appendage includes first and second plates extending perpendicularly from the bottom plate in a cross configuration.

3. The pintle ring lock of claim 1, wherein the lock is key-operated.

4. A pintle ring lock assembly, comprising:
    a pintle ring having an annular frame and a central hole;
    a base having a bottom plate from which an appendage extends, the appendage having an aperture therethrough; and
    a locking cap mounted to the base, the locking cap having a tip plate with a lock mounted thereto, the top plate having a slot and a bolt movable into and out of the slot, the appendage extending through the slot, the bolt being movable into and out of the appendage aperture, the bottom plate and top plate sandwiching the pintle ring therebetween, the lock being bolted to the top plate.

5. The pintle ring lock assembly of claim 4, wherein the pintle ring frame surrounds the base appendage.

6. The pintle ring lock assembly of claim 4, wherein the base appendage includes first and second plates extending perpendicularly from the bottom plate in a cross configuration.

7. The pintle ring lock assembly of claim 4, wherein the lock is key-operated.

8. A method of securing a pintle ring against theft, comprising:
    inserting an appendage through the pintle ring, the appendage extending from a bottom plate, the appendage including an aperture;
    mounting a locking cap onto the appendage, the locking cap having a top plate with a slot adapted to receive the appendage the locking cap further having a lock bolted to the top plate; and
    extending a locking bolt from the locking cap, across the top plate slot, and through the appendage aperture.

9. The method of claim 8, wherein the locking bolt is extended by rotating a key inserted into the locking cap.

10. The method of claim 8, wherein the bottom plate and top plate sandwich the pintle ring, and the pintle ring surrounds the appendage.

* * * * *

UNITED STATES PATENT AND TRADEMARK OFFICE
CERTIFICATE OF CORRECTION

PATENT NO. : 6,786,068 B2  
DATED : September 7, 2004  
INVENTOR(S) : John G. Spooner et al.

It is certified that error appears in the above-identified patent and that said Letters Patent is hereby corrected as shown below:

<u>Column 4,</u>
Line 37, please delete "tip" and insert -- top --.

Signed and Sealed this

Twenty-second Day of February, 2005

JON W. DUDAS
*Director of the United States Patent and Trademark Office*